3,721,717
DISPROPORTIONATION OF TOLUENE
OR XYLENE
George Suld, Springfield, and Ralph L. Urban, Newtown Square, Pa., assignors to Sun Oil Company, Philadelphia, Pa.
No Drawing. Filed Dec. 17, 1970, Ser. No. 99,280
Int. Cl. C07c 3/62
U.S. Cl. 260—672 T        4 Claims

ABSTRACT OF THE DISCLOSURE

Disproportionation of toluene or xylenes to benzene and various alkyl substituted benzenes using as catalyst a silica:alumina mole sieve catalyst having a silica: alumina ratio of from 12 to 20:1. The reaction is carried out at from 250 to 500° C. and a pressure of atmospheric up to 70 atm. Preferably, the catalyst is promoted with from 0.1 to 1.0 weight percent of $Cr^{3+}$ ions.

BACKGROUND OF THE INVENTION

In the past alkyl benzenes have been disproportionated with various silica alumina mole sieves. Generally, these processes have used a catalyst having a silica:alumina ratio of about 10:1 although very high silica:alumina ratios of from 20:1 to 60:1 have also been used when the catalyst also contains a sulfided Group VIII or Group VI–B metal.

SUMMARY OF THE INVENTION

The present invention relates to an improvement over prior processes for the disproportionation of alkyl benzenes, which results in higher yields due to an ultimate closer approach to thermodynamic equilibrium of the various product compounds. This improvement is effected through the use of a carefully controlled catalyst composition.

This catalyst is a decationized natural or synthetic mordenite. Synthetic mordenites having silica to alumina ratios of about 10:1 are commercially available. These available mordenites generally also contain from 0.1 to 0.2 weight percent of sodium ions. These mordenites are treated for use in the present invention by leaching one or more times with a dilute aqueous solution of a strong mineral acid such as hydrochloric acid, nitric acid or sulfuric acid. This leaching is generally carried out with from 5 to 50 weight percent solution of the acid at from 20 to 100° C. About 1 to 5 separate leachings are generally satisfactory to achieve the desired silica to alumina ratio.

The acid leaching also serves to decationize the mordenite thereby reducing the sodium content of the mordenite below 0.05 weight percent which low sodium content has been found to be desirable with respect to catalyst activity.

In a preferred aspect of the present invention the decationized low alumina mordenite is treated with a solution of a trivalent chromium salt in order to replace some of the hydrogen ions with $Cr^{3+}$ ions. Generally, this is done by treating the catalyst with a dilute aqueous solution of a chromic salt. Generally, the solution is from 0.1 to 1.0 N in concentration. Preferably the salt is the chromic salt of a strong mineral acid. Repeated treatments serve to raise the $Cr^{3+}$ concentration in the catalyst. Generally $Cr^{3+}$ concentrations of from 0.1 to 1.0 percent are preferred. The chromic ions serve as a promoter for the catalyst and also, to stabilize the hydrogen mordenite catalyst against fouling, thermal breakdown, etc.

The catalyst is then activated for use by heating in a hydrogen atmosphere. Generally, this heating involves gradually raising the temperature to something in the range of from 400 to 600° C.

The disproportionation reaction is generally carried out at from 250 to 500° C. The pressure is not critical and anything from about atmospheric up to about 70 atmospheres of pressure may be used.

The disproportionation may be applied to toluene to produce benzene and xylene or it may be applied to any or a mixture of the three xylene isomers to produce benzene and toluene along with the polymethylbenzenes.

DESCRIPTION OF THE PREFERRED EMBODIMENTS

In Examples I and II a pulse microreactor is used. This reactor is a stainless steel tube about 200 mm. long and having an inside diameter of 3 mm. The inside of the tube contains Pyrex wool retainers which keep the catalyst in place. In each example the tube is packed with 200 mg. of catalyst. The tube is fitted in a brass mounting sleeve which contains a thermocouple in a well. The brass sleeve is in turn mounted in a 4-inch electric furnace operated on 115 volts and controlled by a 7.5 amp. powerstat. The top of the tube is fitted with a silicone rubber septum mounted in a septum holder and with a carrier gas inlet. The carrier gas is deoxygenated dry hydrogen passed through the system at a rate of about 50 cc. per minute under a pressure of about 30 p.s.i.g. The gas in the reactor is maintained at 350° C. Generally the catalyst is preconditioned by injecting a 50-microliter pulse of the material being disproportionated (either toluene or xylene). The reactor effluent from this injection is not analyzed. A 2.5-microliter charge of the material being disproportionated is then injected through the septum into the reactor and the resultant effluent is programmed through a previously calibrated gas chromatograph.

EXAMPLE I

A 250-gram sample of "H-Zeolon"® (Norton Co.) a decationized mordenite having a silica to alumina ratio of 10 to 1 and a sodium content of 0.17 percent is placed in a 200 cc. glass beaker and equilibrated with atmospheric moisture for about three hours, after which 1200 ml. of 6 N aqueous hydrochloric acid is added and the slurry stirred magnetically at about 45° C. for 30 minutes. The catalyst is filtered and again leached with a fresh 1200 ml. portion of 6 N aqueous hydrochloric acid. After filtration the catalyst is then ion exchanged 10 times each time with 1200 ml. of 1 N aqueous chromic chloride at about 55° C.

The catalyst powder is then dried at 120° C. overnight. Plural analyses indicates that the silica:alumina ratio of the catalyst is between 13:1 and 16:1 that the sodium content of the catalyst is less than 0.05 percent, and that the $Cr^{3+}$ content of the catalyst is about 0.3 percent.

The catalyst (200 mg.) is placed in the reactor tube and activated under hydrogen flow at about atmospheric pressure for 30 minutes at room temperature, heating to 230° C. over a 90-minute period, holding at 230° C. for 30 minutes, then heating to 510° C. over a 60-minute period and holding at 510° C. for 30 minutes.

The reactor is maintained at 350° C. The catalyst is preconditioned with a 50 µl pulse of toluene followed by a 2.5 µl analytical pulse then in sequence with a 300 µl conditioning pulse, a 2.5 µl analytical pulse, a 300 µl conditioning pulse, a 2.5 µl analytical pulse, a 350 µl conditioning pulse, a 2.5 µl analytical pulse, a 700 µl conditioning pulse, and finally a 2.5 µl analytical pulse. The analysis of the product of the 2.5 µl pulses by gas chromatography indicate conversions of toluene to benzene, xylenes and some trimethylbenzenes of 40–45%.

EXAMPLE II

Example I is repeated except the reactor is operated at 400° C. The reactor is pulsed with 50 ml. of toluene followed by 2.5 µl pulse of toluene which is analyzed by G.C. and the conversion of toluene to benzene xylenes and some trimethyl benzenes is indicated to be 55–60 percent which approaches the thermodynamic equilibrium concentration.

EXAMPLE III

This example illustrates the disproportionation of xylenes in a continuous flow reactor. The reactor is a stainless steel tube 33 cm. long and having an internal diameter 1.1 cm. The catalyst bed contains 10 cc. of the catalyst prepared as in Example I, except the catalyst is pelletized and then sized into 16–30 mesh particles. The catalyst is activated with hydrogen using the temperatures and times set forth in Example I.

The reactor is operated at 330° C. and the charge to the reactor is a mixture containing 0.7 percent toluene, 26.8 percent ethyl benzene, 11.2 percent p-xylene, 51.2 percent m-xylene, and 10.1 percent o-xylene. The starting mixture is fed through the catalyst bed at a rate of 2.3 LHSV until a total of 10.9 g. per g. of catalyst of the mixture has passed through the catalyst bed. The analysis of the products is reported in Table I as run 1. In a later run under otherwise identical conditions a 18.2 g. per g. of catalyst sample of the mixture is fed to the reactor at a rate of 1.2 LHSV. The products obtained in this run are reported in Table I as run 2. In Table I the percents reported are weight percent on a non-loss basis. (The material balance of the analysis was 98 percent.)

TABLE I

| Product | Run 1, percent | Run 2, percent | Thermodynamic equilibrium,[1] $C_6$-$C_{10}$ polymethyl benzenes |
|---|---|---|---|
| Benzene | 2.8 | 2.9 | 4.2 |
| Toluene | 17.4 | 17.7 | 20.8 |
| Ethyl benzene | 8.6 | 8.0 | |
| p-Xylene | 9.2 | 9.1 | 10.0 |
| m-Xylene | 21.4 | 20.9 | 22.5 |
| O-Xylene | 8.7 | 8.7 | 9.1 |
| Methyl ethyl benzenes | 13.5 | 14.1 | |
| Trimethyl benzenes | 11.2 | 11.7 | 25.4 |
| Diethylbenzenes | 1.8 | 1.9 | |
| Dimethyl ethylbenzenes | 6.4 | 4.8 | |
| 1,2,4,5-tetramethylbenzene | 0.5 | 0.3 | 2.5 |
| 1,2,3,5-tetramethylbenzene | 1.0 | 0.7 | 3.9 |
| Beyond 1,2,3,5-tetramethylbenzene | 1.3 | 1.4 | 1.2 |

[1] Calc'd at 600° K., J. Chem. Eng. Data 6, (1961).

What is claimed is:

1. A process comprising contacting an alkyl aromatic compound selected from the class consisting of toluene and xylene with a mordenite catalyst containing silica and alumina in a ratio of from 12 to 20:1 silica: alumina and wherein the mordenite catalyst contains from 0.1 to 1 weight percent chromic ions and less than 0.05 weight percent sodium ions, at from 250 to 500° C. whereby said alkyl aromatic compound is disproportionated into compounds selected from the class consisting of other alkyl aromatic compounds and benzene.

2. The process of claim 1 wherein the reaction is carried out at a pressure of from 1 to 70 atmospheres.

3. The process of claim 1 wherein the alkyl aromatic compound being contacted with the mordenite is toluene.

4. The process of claim 1 wherein the alkyl aromatic compound being contacted with the mordenite is xylene.

References Cited

UNITED STATES PATENTS

| 3,531,243 | 9/1970 | Aitken et al. | 252—455 Z |
| 3,464,929 | 9/1969 | Mitsche | 260—672 T |
| 3,476,821 | 11/1969 | Brandenburg et al. | 260—672 T |
| 3,480,539 | 11/1969 | Voorhies et al. | 208—111 |
| 3,551,510 | 12/1970 | Pollitzer et al. | 260—672 T |
| 3,578,723 | 5/1971 | Bowes et al. | 260—672 T |

CURTIS R. DAVIS, Primary Examiner